US008322673B2

(12) United States Patent
Sculler

(10) Patent No.: US 8,322,673 B2
(45) Date of Patent: Dec. 4, 2012

(54) FLAT PANEL DISPLAY MOUNTING

(75) Inventor: Steven J. Sculler, Morganville, NJ (US)

(73) Assignee: Bell'O International Corp., Morganville, NJ (US)

( * ) Notice: Subject to any disclaimer, the term of this patent is extended or adjusted under 35 U.S.C. 154(b) by 455 days.

(21) Appl. No.: 12/319,286

(22) Filed: Jan. 5, 2009

(65) Prior Publication Data

US 2009/0184221 A1 Jul. 23, 2009

Related U.S. Application Data

(60) Provisional application No. 61/010,171, filed on Jan. 4, 2008.

(51) Int. Cl.
*A47H 1/10* (2006.01)

(52) U.S. Cl. ........................................ 248/317; 248/917

(58) Field of Classification Search .................. 248/323, 248/317, 339, 340, 917, 918, 919, 490, 495, 248/496, 497; 361/679.21; 403/368, 370, 403/409.1
See application file for complete search history.

(56) References Cited

U.S. PATENT DOCUMENTS

| 2,740,327 | A | * | 4/1956 | Stegeman | 351/91 |
| D493,800 | S | * | 8/2004 | Pfister et al. | D14/451 |
| D532,290 | S | * | 11/2006 | David | D8/373 |
| 7,334,766 | B2 | * | 2/2008 | Ligertwood | 248/292.13 |
| 7,712,717 | B2 | * | 5/2010 | Burns | 248/291.1 |
| 7,823,847 | B2 | * | 11/2010 | Bremmon et al. | 248/201 |
| 2009/0084918 | A1 | * | 4/2009 | Pfister et al. | 248/292.14 |

* cited by examiner

*Primary Examiner* — A. Joseph Wujciak, III
(74) *Attorney, Agent, or Firm* — Lerner, David, Littenberg, Krumholz & Mentlik, LLP

(57) ABSTRACT

A television mounting system includes a wall plate, at least one monitor arm mountable on the wall plate, and a locking mechanism including a rotating locking element permanently connected with the monitor arm. The rotating element is moveable, by rotation of the rotating element a portion of a revolution, between an unlocked position for enabling dismounting of the at least one monitor arm from the wall plate, and a locked position for preventing dismounting of the at least one monitor arm from the wall plate. The rotating element includes a first side having a different height than a second side. In the locked position of the locking element, the first side is less of a distance from a contact portion of the wall plate than a distance the monitor arm must be moved for dismounting the monitor arm from the wall plate, such that the locking element contacts the contact portion before the monitor can be moved for being dismounted from the wall plate.

26 Claims, 19 Drawing Sheets

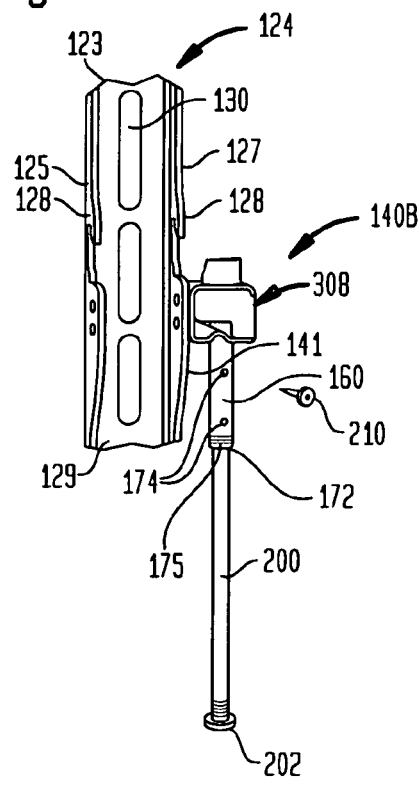
FIG. 3
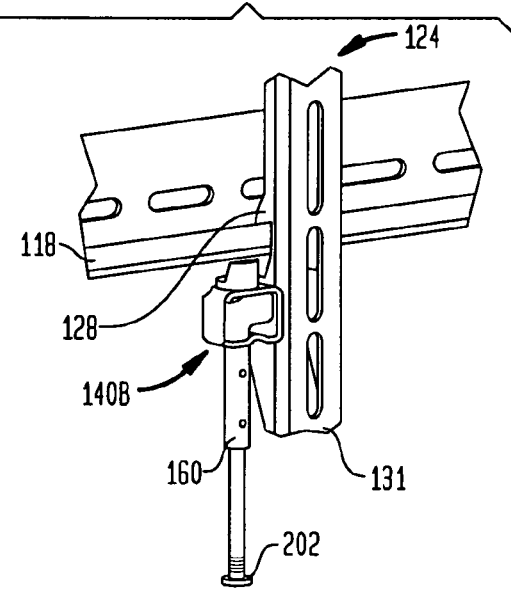
FIG. 4
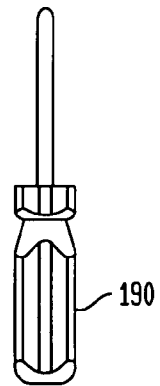

FLAT PANEL DISPLAY MOUNTING

CROSS REFERENCE TO RELATED APPLICATION

This application claims the benefit of the filing date of U.S. Provisional Patent Application No. 61/010,171 filed Jan. 4, 2008, the disclosure of which is hereby incorporated herein by reference.

BACKGROUND OF THE INVENTION

The present invention relates to television displays and more particularly relates to television mounting systems for flat panel displays.

Recently, there has been a marked growth in the popularity of flat panel displays, and in particular flat panel televisions. Flat panel televisions presently use one of two technologies, either liquid crystal or plasma display, to provide a display screen that is much thinner and lighter than traditional cathode ray televisions or projection televisions. Flat panel televisions are also versatile in that they can be placed on a stand or mounted on numerous surfaces such as a wall.

Typical systems for mounting a flat panel television to a wall include a wall mount, which is secured to the wall, and one or more mounting brackets, which are secured to the flat panel television. The brackets, with the flat panel television secured thereto, may be engaged with the wall mount, thereby mounting the flat panel television to the wall. In typical television mounting system installations, for aesthetic purposes the space between the mounted television and the associated wall is very narrow.

Many flat panel television mounting systems include a locking mechanism for preventing the television from being dismounted, inadvertently or intentionally, from its mounted position on an associated wall mount. The locking mechanism typically is located within the narrow space between the mounted television and the wall, which makes user access to and operation of the mechanism difficult. For example, the locking mechanism may not be located proximate an edge of the television, such that a tool that needs to be engaged with the locking mechanism for operating the mechanism must be relatively long, and inserted a relatively long distance into the narrow space. In addition, some locking mechanisms include a rotating element that needs to be rotated, usually using a tool that has been engaged with the rotating element, several revolutions to lock the television into the mounted position. As the space between the mounted television and wall is typically very narrow, the engagement of the tool with the rotating element and rotating of the tool several revolutions may be difficult, especially when the distance between the rotating element and the edge of the mounted television is relatively large.

Thus, a need exists for a television mounting system including a locking mechanism which a user may easily access and operate to prevent dismounting of a flat panel television which is mounted to an associated wall mount.

SUMMARY OF THE INVENTION

In accordance with one aspect of the present invention, a television mounting system includes a wall plate, at least one monitor arm mountable on the wall plate, and a rotating locking element permanently connected with the monitor arm. The rotating element may be moved between an unlocked position for enabling mounting and dismounting of the at least one monitor arm from the wall plate, and a locked position, for preventing dismounting of the at least one monitor arm from the wall plate, by rotating the rotating element a portion of a revolution. The rotating element includes a first side having a different height than a second side. When the rotating element is in the locked position and the at least one monitor arm is mounted on the wall plate, the first side of the rotating element is a first distance from a contact portion of the wall plate. The first distance is less than a second distance the monitor arm must be moved for dismounting the monitor arm from the wall plate, such that, with the rotating element in the locked position and the monitor arm mounted on the wall plate, the first side contacts the contact portion before the monitor arm can be moved the second distance, thereby preventing dismounting of the monitor arm from the wall plate.

In a further embodiment, when the rotating element is in the unlocked position and the at least one monitor arm is mounted on the wall plate, the second side of the rotating element is a third distance from the contact portion of the wall plate. The third distance is greater than the second distance, such that, with the rotating element in the unlocked position and the monitor arm mounted on the wall plate, the monitor arm can be moved a distance at least equal to the second distance before the second side contacts the contact portion of the wall plate, thereby enabling dismounting of the monitor from the wall plate.

In still a further embodiment, the monitor arm comprises at least one hook engagable with a ledge of the wall plate, for mounting the monitor arm to the wall plate. With the monitor arm mounted to the wall plate, the hook must be moved a distance equal to the second distance for disengaging the hook from the ledge, thereby enabling the monitor arm to be dismounted from the wall plate.

In accordance with another aspect of the invention, the rotating locking element may be coupled with an extension element for extending the length of the rotating element.

In accordance with still another aspect of the invention, the rotating locking element may be coupled to a resilient element, such as a spring, for restricting free rotation of the rotating element.

In accordance with a further aspect of the invention, the permissible extent of rotation of the rotating locking element may be restricted by a stop device. In one embodiment, the stop device may include a pin radially extending from the rotating element and a stop contact surface positioned in a rotational path of the pin for restricting rotation of the pin.

In accordance with another aspect of the invention, the system may include a keying element for indicating rotation of the rotating element to a desired unlocked position or locked position.

BRIEF DESCRIPTION OF THE DRAWINGS

FIG. 3 shows a partial view of a monitor arm of the system of FIGS. 2A and 2B including a locking mechanism, in accordance with one aspect of the invention.

FIG. 4 shows a partial view of a monitor arm mounted to a wall plate of the system of FIGS. 2A and 2B.

DETAILED DESCRIPTION OF THE INVENTION

Figure 1A:
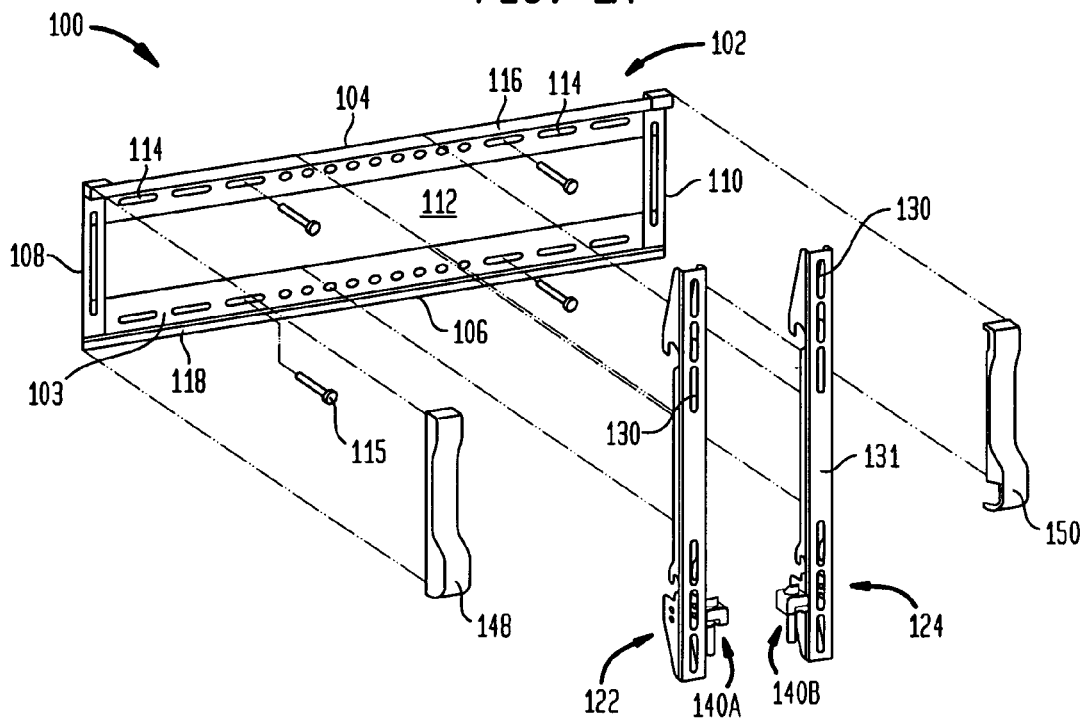
FIGS. 1A and 1B show an exploded view of a television mounting system, in accordance with an aspect of the present invention.
Figure 1B:
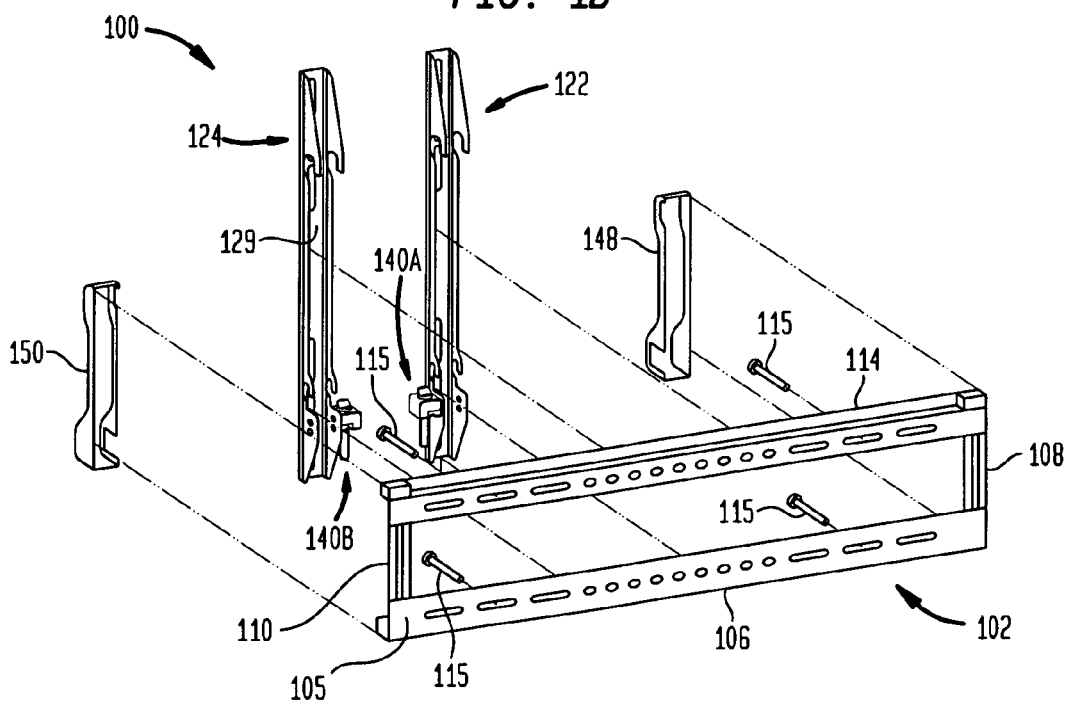

In accordance with an aspect of the present invention, referring to FIGS. 1A and 1B, an exemplary television mounting system 100 includes a wall plate 102 having an upper end 104, a lower end 106, a front side 103, a back side 105, a first end side 108 and a second end side 110. The wall plate 102 is desirably made of a sturdy material, such as metal. The wall plate 102 has a central opening 112 extending between the ends 104, 106 and the sides 108, 110. The opening 112 may be used for passing wires or cables through the wall plate 102, such as audio, video or power cables. The cables passed through the central opening 112 are desirably connected with a flat panel television or monitor for supplying power, audio or video to the television. The wall plate 102 also includes a plurality of mounting openings 114 disposed along the upper and lower ends 104, 106. The openings 114 may be used for securing the wall plate 102 to a wall or like surface using fastening screws 115. The television mounting system 100 also desirably includes end caps 148, 150 which may be fit over the sides 108, 110, respectively, of the wall plate 102.

The wall plate 102 includes an upper horizontal ledge 116 that extends along the upper end 104 between the first and second sides 108, 110. In addition, the wall plate 102 includes a lower horizontal ledge 118 extending between the first and second sides 108, 110.

Referring also to FIG. 3, the television mounting system 100 also may include monitor brackets or arms 122 and 124. Each of the monitor arms 122, 124 includes a back wall 123 having front and back surfaces 129, 131, respectively, and opposing sides 125, 127 extending orthogonally from the front surface 129. The monitor arms 122, 124 are adapted to be secured to a flat panel monitor or television. Although only two monitor arms are shown in FIG. 1, in other embodiments, the television mounting system may use less than two or more than two monitor arms.

Figure 2A:
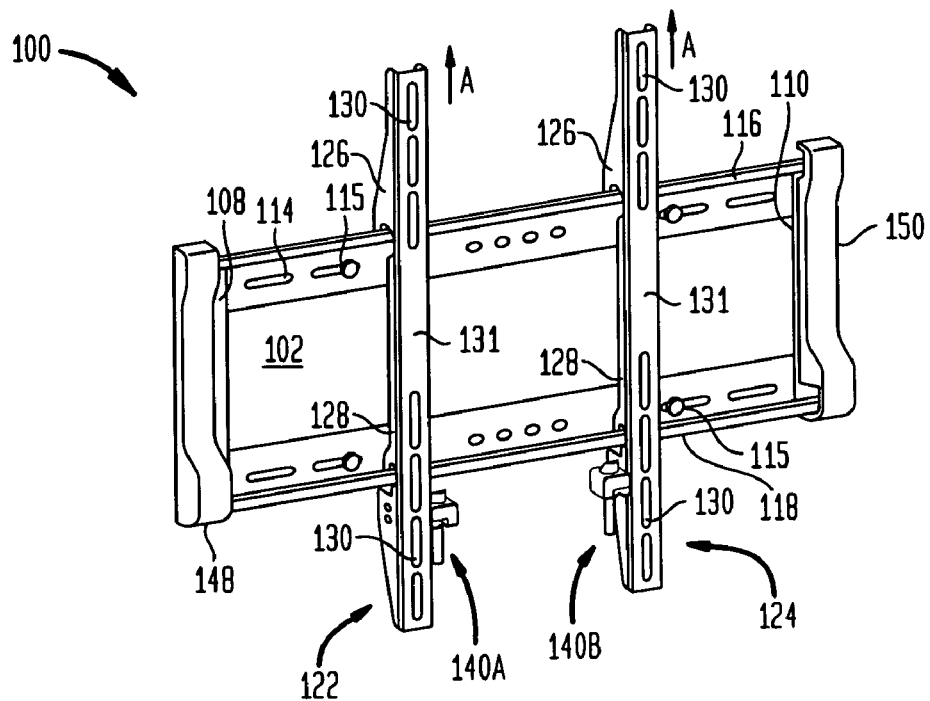
FIGS. 2A and 2B show the television mounting system of FIGS. 1A and 1B in an assembled configuration.
Figure 2B:
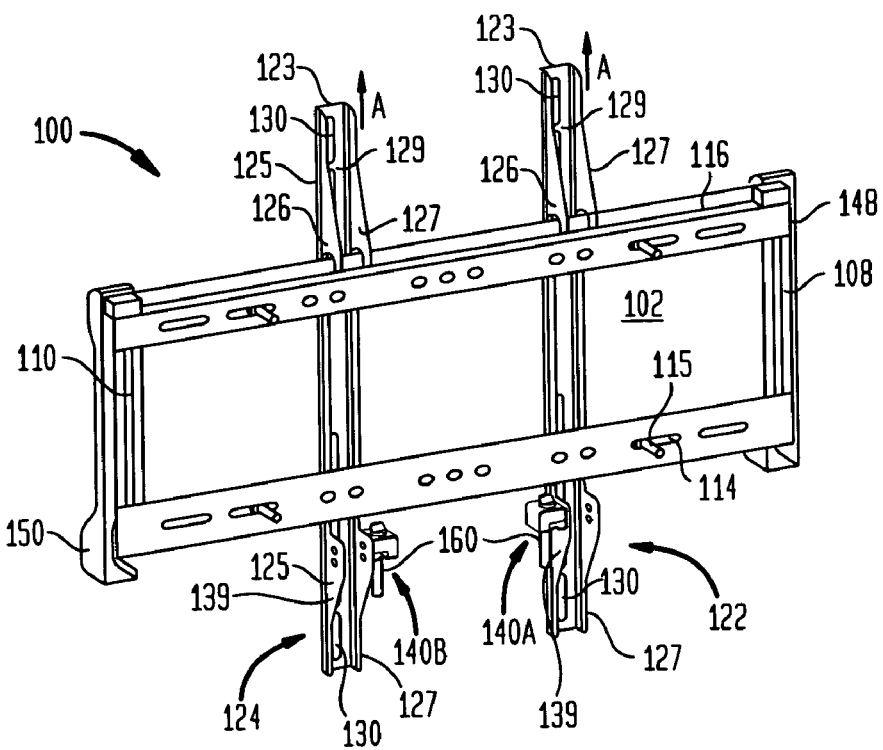

Further referring to FIGS. 2A and 2B, which show the television mounting system 100 of FIGS. 1A and 1B in an assembled configuration with the monitor arms 122, 124 mounted to the wall plate 102, each of the monitor arms 122, 124 includes an upper hook 126 extending from each of the sides 125, 127, for engaging with the upper ledge 116, and a lower hook 128 extending from each of the sides 125, 127, for engaging with the lower ledge 118. Each of the monitor arms 122, 124 also includes openings 130 in the back wall 123 through which fasteners such as screws (not shown) may be passed for securing the monitor arms to a television monitor.

The television mounting system 100 also may include a locking mechanism 140 connected to a monitor arm and operable for preventing dismounting of the monitor arm from the wall plate, in accordance with aspects of the present invention. In one embodiment, as shown in FIGS. 2A-2B and FIG. 3, the locking mechanism 140 may include a support housing 308 connecting the mechanism 140 to the monitor arm and a rotating locking element 160, such as a rotatable cylinder. In the exemplary illustrated embodiment of the system 100, a locking mechanism 140A is fixed to an outer surface 139 of the side 125 of the arm 122, and a locking mechanism 140B is fixed to an outer surface 141 of the side 127 of the arm 124. Further referring to FIGS. 5A, 5B, 5C and 5D, the rotatable cylinder 160 may include a top portion 162 having a lower side surface 164 and an upper side surface 166. As discussed below, the difference between the heights of the side surfaces 164, 166 on the top portion 162 is utilized for providing the locking function of the locking mechanism 140. The cylinder 160 also includes a tool head engagement end 172, opposite the top portion 162, and desirably including at least one groove (not shown), for engaging with a head of a screwdriver or a hex drive tool. In a further embodiment, outer surface 175 of the cylinder 160 adjacent the end 172 may have a roughened, ridged or like surface texture for frictionally engaging with the fingers of a user. The cylinder 160 also may define a hollow, cylindrically-shaped interior region 161 (not shown) extending along its length between the top portion 162 and the end 172, and one or more apertures 174 may be defined in the cylinder 160 and extend into the region 161. In an alternative embodiment, the cylinder 160 may be solid except for the apertures 174.

In the illustrated embodiment of the mechanism 140, the top portion 162 is generally cylindrically-shaped and has a ramped or ascending configuration, where a surface 168 angularly extends between the lower and upper side surfaces 164, 166. In an alternative embodiment, the top portion 162 may have an L-shaped configuration, where the surface 168 is orthogonal to the side surfaces 164 and 166.

In the assembled configuration of the system 100, the hooks 126 are positioned over the ledge 116 and the hooks 128 are positioned over the ledge 118, as shown in FIGS. 2A and 2B, 4 and 5A-5D, such that the hooks 126, 128 engage with the ledges 116, 118, respectively, and thus the arms 122, 124 are mounted to the wall plate 102. As discussed in detail below, in accordance with aspects of the present invention, the top portion 162 of the locking mechanism 140 is adapted, such that only when the rotating element 160 has been rotated, such as by use of a tool engaged with the end 172 or by the user gripping the surface 175 with his fingers, to a position which sets the locking mechanism 140 in an unlocked position, the monitor arm may be moved to be mounted upon, or dismounted from, the wall plate 102. In addition, the top portion 162 is adapted such that, when a monitor arm is mounted on the wall plate 102 and the rotating element 160 has been rotated to a position which sets the locking mechanism 140 in a locked position, the monitor arm cannot be moved to become dismounted from the wall plate 102, because the upper surface 166 of the top portion 162 is positioned to contact a portion of the wall plate 102 before the hook 128 can be disengaged from the ledge 118, as discussed in detail below. In accordance with aspects of the present invention, rotating the rotating element 160 less than a portion of a revolution may move the locking mechanism 140 between a locked position and an unlocked position. In addition, with the locking mechanism 140 in a locked position, the monitor arm cannot be moved to become mounted to the wall plate 102, because the upper surface 166 of the top portion 162 is positioned to contact a portion of the wall plate 102, which in turn prevents the hook 128 from becoming engaged with the ledge 118. Consequently, with the arms 122, 124 mounted on the wall plate 102 and secured to a television monitor, and the locking mechanisms 140 in a locked position, the monitor is prevented from being inadvertently or intentionally removed from its mounted connection to the television mounting system 100.

An exemplary installation of the exemplary inventive mounting system 100 for mounting a flat panel television to a wall surface is described below with reference FIGS. 2-9. The wall plate 102 may be secured at a desired location on a wall surface 151, with the back side 105 facing the wall surface 151, using screws 115 that extend through the openings 114. Referring to FIG. 6, the arms 122, 124 may be secured to a back surface 183 of a flat panel television 180 using screws 135 extending through the openings 130, where the back surface 131 of the back wall 123 of each of the monitor arms faces the back surface 183 of the television 180. The arms 122, 124 are desirably secured to the television 180, such that the locking mechanisms 140A, 140B oppose each other.

Figure 7:
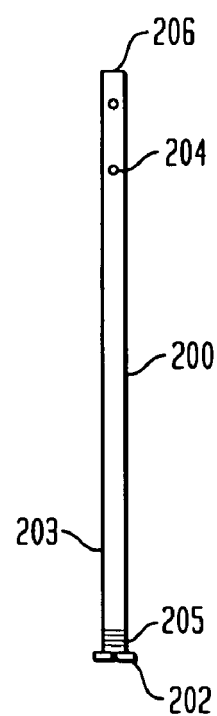
FIG. 7 shows an exemplary extension element, in accordance with one aspect of the invention.

In one desired embodiment, rotating element extension elements 200, such as screws, shafts or the like, of varying length and desirably cylindrical in shape, as shown in FIG. 7, are provided with the mounting system 100. An extension element 200 desirably may be used to effectively extend the length of the cylinder 160. The extension of the length of the cylinder 160 using the extension element 200 eases user access to the cylinder 160 for engaging a tool with the cylinder 160 and rotating the cylinder 160 to switch the setting of the locking mechanism 140 between an unlocked and unlocked position.

Referring to FIGS. 3-4 and 6-7, the extension element 200 may include a shaft 203 terminating at a screw head or hex drive end 202, which desirably is of the same configuration as the end 172 of the cylinder 160, and one or more apertures 204 in the shaft 203 adjacent an upper end 206 opposing the end 202. In addition, outer section 205 of the element 200 adjacent the end 202 may have a surface texture, which is similar to the surface 175, for frictionally engaging with the fingers of a user. The apertures 204 desirably are of the same size and shape as the apertures 174 of the cylinder 160. In addition, the shaft 203 has the same configuration as, and a diameter slightly less than the diameter of, the interior region 161 of the cylinder 160, such that the extension element 200 may be inserted within the interior region 161 of the cylinder 160. By inserting the element 200 within the interior region 161, and selectively aligning the apertures 204 and 174, a screw 210 can be passed through the aligned apertures to secure the element 200 to the cylinder 160, thereby effectively extending the length of the cylinder 160.

Referring again to FIG. 6, an extension element 200 of a desired length may be selected and attached to the cylinder 160, based on alignment of respective apertures, to extend the cylinder 160 as close as possible to the bottom edge 181. Desirably, the element 200 does not extend beyond a bottom edge 181 of the television 180 to avoid the element 200 being visible when the television is mounted to the wall plate 102. By attachment of the extension element 200 to the cylinder 160, a shorter length of a tool, which may be engaged with the cylinder 160 for rotating the cylinder 160, may be inserted in a narrow space that typically would exist between the back surface 183 of the mounted television 180 and the associated wall 151, thereby easing user access to and operation of the locking mechanism 140.

In an alternative embodiment, the extension element 200 may define a hollow interior region (not shown) having the same configuration as, and a diameter slightly larger than the diameter of, the cylinder 160. In such embodiment, the extension element 200 may be slid over the cylinder 160 at the end 172, and then the element 200 may be attached to the cylinder 160 by passing the screw 210 through aligned apertures 204 and 174.

Referring again to FIG. 6, after the arms 122, 124 are secured to the television 180, and the optional attachment of the extension elements 200 to the respective cylinders 160, the locking mechanisms 140 are placed in the unlocked position, if not already in such position. Further referring to FIGS. 5A and 5C, the locking mechanism 140 is in an unlocked position when the upper surface 166 is closer to the back wall 123 of the arm, and thus to the television 180 to which the arm is secured, than the lower surface 164. Referring to FIGS. 5B and 5D, the locking mechanism 140 is in a locked position when the lower surface 164 is positioned closer to the back wall 123 of the arm, and thus to the television 180 to which the arm is secured, than the upper surface 166. As needed, the user may engage a tool 190, such as a screwdriver or hex driver as shown in FIG. 4, with the end 202 of the extension element 200, or the end 172 of the cylinder 160 when an extension element 200 is not used, and then rotate the tool to cause the cylinder 160 to rotate to set the mechanism 140 to an unlocked position. Alternatively, the user may grip the surface 175 of the cylinder 160, or the surface 205 of the extension element 200, with the fingers of a hand and then rotate his hand to cause the cylinder 160 to rotate to set the mechanism 140 to an unlocked position.

Figure 8:
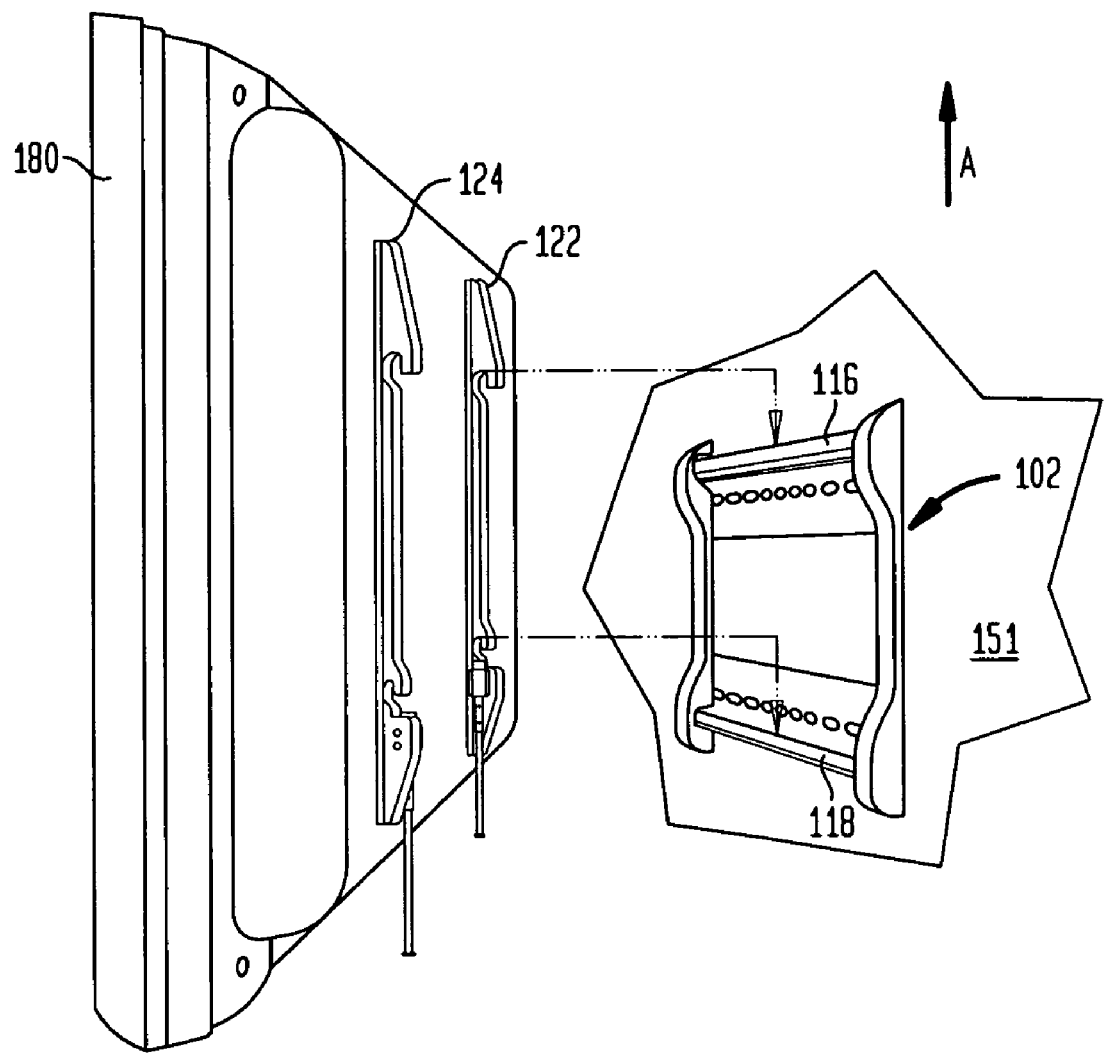
FIG. 8 shows a perspective view of mounting arms secured to a television during assembly of the mounting system shown in FIGS. 2A-2B.
Figure 9:
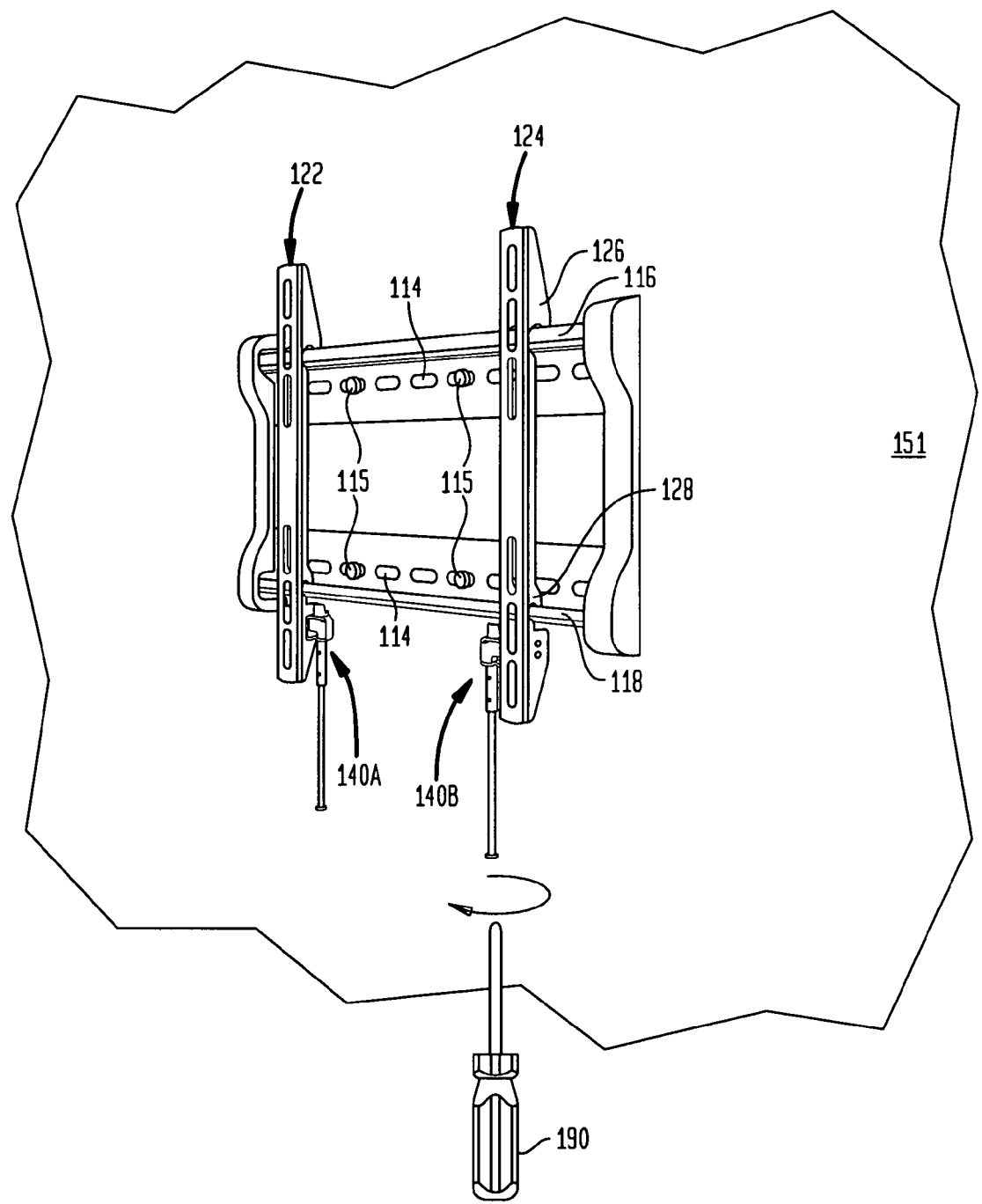
FIG. 9 shows a perspective view of the mounting system of FIGS. 2A-2B in an assembled configuration and secured to a wall.

With the locking mechanisms 140 set to an unlocked position, the arms 122, 124 may be mounted to the wall plate 102 by positioning the arms 122, 124 such that the hooks 126, 128 can be moved vertically downwardly, in the direction opposite to the direction indicated by the arrow A, over the ledges 116, 118, respectively, as shown in FIGS. 8 and 9, and thus become engaged with the ledges 116, 118. As the wall plate 102 and the arms 122, 124 are desirably of a very small dimension, with the arms 122, 124 mounted to the wall plate 102, a very small distance S, such as about 1-3 inches, separates the wall 151 and the back surface 183 of the television 180, as shown in FIGS. 5C and 5D.

Referring again to FIGS. 5A and 5C, which show the arm 124 mounted to the wall plate 102 and the locking mechanism 140B in an exemplary unlocked position, lower end 133 of the hook 128 is a distance D1 from top lip 119 of the ledge 118. D1 is the distance the television 180 would need to be moved vertically upward in the direction of the arrow A, so that the lower end 133 of the hook 128 is above or clears the lip 119 of the ledge 118. When the lower end 133 is above the lip 119, the hook 128 may be disengaged from the ledge 118 and, thus, the arm 124 may be dismounted from the wall plate 102. In addition, in the unlocked position, the lower surface 164 of the top portion 162, which is further from the television 180 than the upper surface 166, is a distance D2 from an opposing portion of the ledge 118. When the television 180 is moved in the direction A, the surface 164 also moves in the same direction, and toward an opposing portion of the ledge 118. In accordance with aspects of the present invention, D2 exceeds D1 such that, when the television 180 is in a mounted position with the locking mechanism 140 in the unlocked position and moved in the direction A, the hook 128 can be moved a distance at least equal to the distance D1, so as to clear the lip 119, before the surface 164 would contact an opposing portion of the ledge 118, such that the monitor arm 124 may become dismounted from the wall plate 102, and thus the television 180 may be removed from the wall plate 102.

Figure 5A:
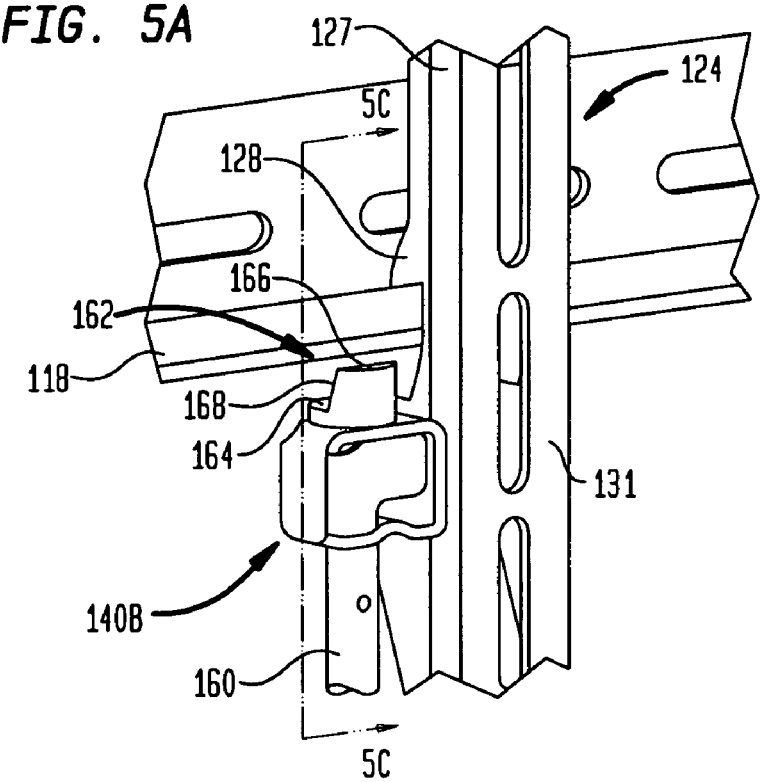
FIGS. 5A-5D show further partial views of the television mounting system shown in FIGS. 2A-2B.
Figure 5B:
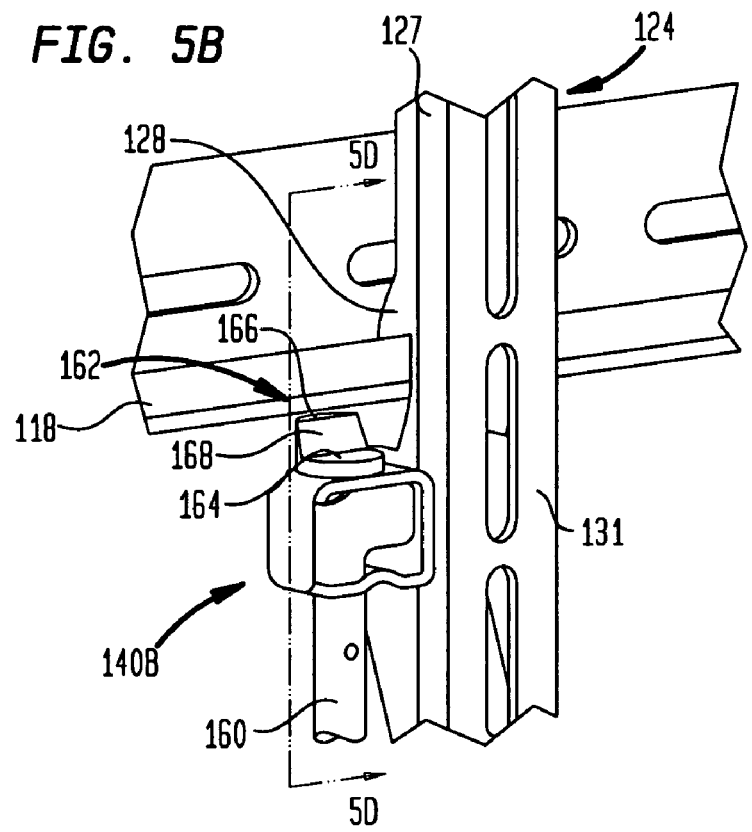
Figure 5C:
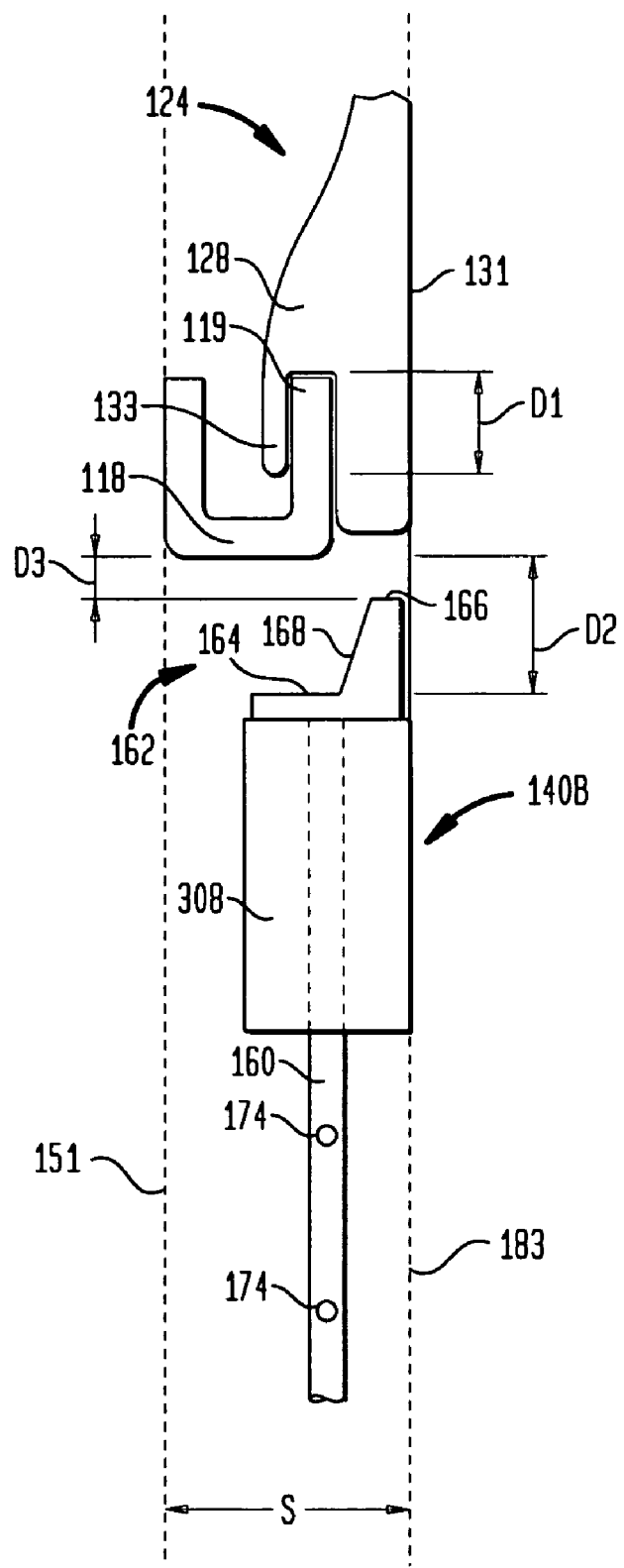
Figure 5D:
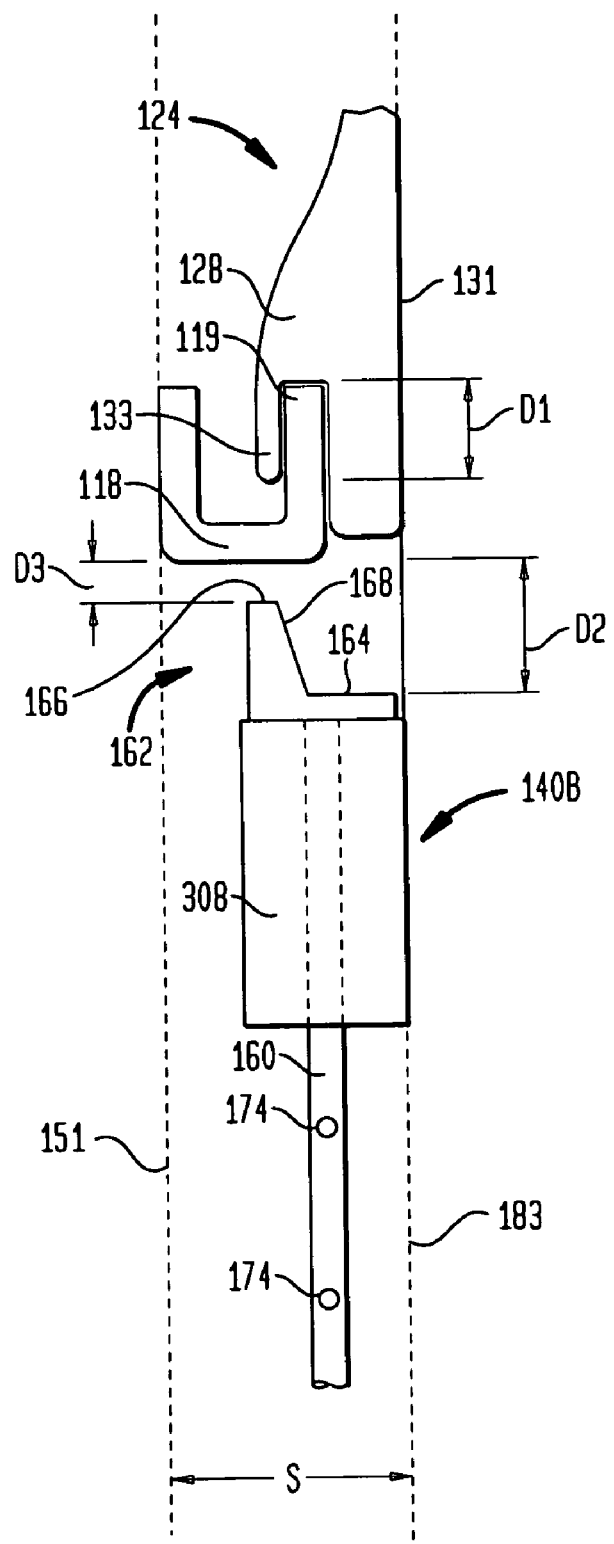
Figure 6:
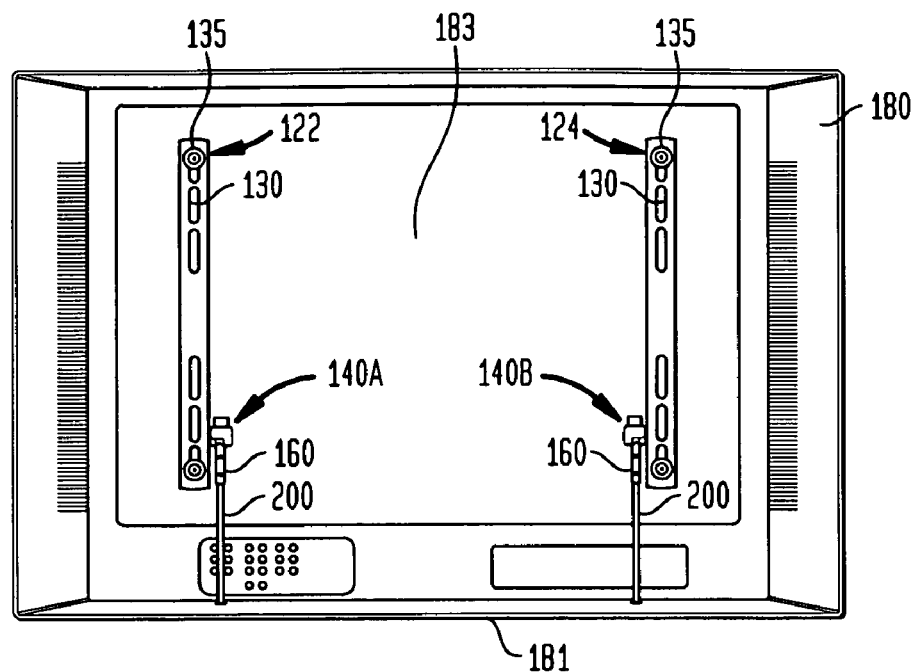
FIG. 6 shows a view of the monitor arm of the system of FIGS. 2A-2B secured to a back surface of a television monitor.

In one embodiment, the locking mechanisms 140 may be switched from the unlocked position, as shown in FIGS. 5A and 5C, to the locked position, as shown in FIGS. 5B and 5D, by rotating the cylinder 160 a portion of a revolution, such as approximately 180 degrees, so that the upper surface 166 is opposite a portion of the ledge 118, as shown in FIGS. 5B and 5D. In the locked position, the upper surface 166 is a distance D3 from an opposing portion of the ledge 118. In accordance with aspects of the present invention, in the locked position D3 is less than D1, and the surface 166 is closer to a vertically opposing portion of the ledge 118 than the surface 164. In contrast, referring to FIGS. 5A and 5C, in the unlocked position the surface 164 is closer to a vertically opposing portion of the ledge 118 than the surface 166. Therefore, in the locked position of the mechanism 140 with the arm 124 mounted to the wall plate 102, if the television 180 is moved in the direction A, the surface 166 would contact an opposing portion of the ledge 118 before the end 133 of the hook 128 moves (also in the direction A) a distance equal to D1, such that the arm 124 would be prevented from being dismounted from the wall plate 102. The differences between D1 and each of D2 and D3, therefore, provide a locking function, where, when the locking mechanisms 140 are set to a locked position, the mounted television 180 is prevented from being dismounted from the wall plate 102.

In desired embodiments, the cylinder 160 may be rotated a portion of a revolution, such as 180 degrees or less, to move the mechanism 140 from an unlocked position to a locked position, or vice versa. For example, rotating the cylinder 160 by as little as about 60 degrees may position a sufficient portion of the upper surface 166 opposite a portion of the ledge 118, such that, when the mounted television 180 with the arms 122, 124 is moved in the direction A, the upper surface 166 would contact the ledge 118 before the hook 128 can be disengaged from the ledge 118.

Consequently, the present invention advantageously provides that, in the typically small distance between a wall and a flat panel television secured to a monitor arm placed in an assembled configuration of the inventive mounting system on an associated wall plate secured to the wall, a user may readily move a locking mechanism of a monitor arm between an unlocked position and unlocked position, by rotating a rotating locking element, such as the cylinder 160, less than an entire revolution. The rotation of the rotating element may be performed by gripping of the rotating locking element or an extension element attached thereto with the fingers of a user's hand which is inserted only a relatively short length in the space S, or alternatively with a tool, such as desirably an L-shaped hex driver or screwdriver as described above, that is inserted only a relatively short length in the space S to engage with the rotating element, or an extension element attached to the rotating element, as suitable.

It is to be understood that the extent the rotating element needs to be rotated, to move the mechanism 140 between an unlocked position and a locked position, is a function of the configuration of the surfaces 164, 166 on the top portion 162 of the rotating element 160. In one embodiment, the upper side surface 166 may be configured such that rotating the cylinder 160 only about 30 degrees, or even a lesser amount, moves the mechanism 140 from an unlocked position to a locked position, or vice versa.

In another aspect of the invention, a locking mechanism 300, as exemplarily shown in FIGS. 10A, 10B, 10C and 10D, may include a resilient element, such as a spring, which avoids undesired rotation of a rotating locking element of the locking mechanism, thereby maintaining the locking mechanism in a desired locked or unlocked position. Elements of the locking mechanism 300 which are the same or similar to those in the mechanism 140 discussed above are referred to below using the same reference numerals. For highlighting the features of the mechanism 300, the mechanism 300 is illustrated in FIGS. 10A, 10B, 10C and 10D as being connected to the monitor arm 122, similarly as described above for the mechanism 140, where the hook 128 of the monitor arm 122 may be engaged with and disengaged from the ledge 118 of the wall plate 102 as described above for the system 100. Referring to FIGS. 10A, 10B, 10C and 10D, the locking mechanism 300 may include a rotatable cylinder 160 and a barrel 302 interconnecting a top portion 162 and the cylinder 160. A support housing 308 attaches the mechanism 300 to an outer surface 139 of the side 125 of the arm 122 and includes a vertical wall 310 fixed to the surface 139, and upper and lower flanges 312, 314, respectively, extending away from the wall 310. The flanges 312, 314 include apertures (not shown) through which the barrel 302 and the cylinder 160 extend, respectively. The upper flange 312 separates the top portion 162 from the cylinder 160. A resilient element 320 in the form of a spring 320 encircles the barrel 302, and is attached at one end to a lower surface 306 of the flange 312 and at an opposite end to a radial ridge surface 322 of the cylinder 160. The spring 320 biases the cylinder 160 vertically downward, opposite to the direction A, such that the top portion 162 normally is seated upon upper surface 324 of the flange 312. Desirably, the spring 320 has a predetermined spring constant that prevents rotation of the cylinder 160, unless a sufficient rotational force, or a combination of a sufficient force in the direction A and rotational force, is applied to the cylinder 160 to overcome the downward biasing force of the spring 320. Consequently, the spring 320 urges the top portion 162 against the upper surface 324 of the flange 312, so that the locking mechanism 300 cannot be moved between a desired locked position and another position, such as an undesired unlocked position, by a user inadvertently applying a relatively small rotational force to the cylinder 160.

Figure 10A:
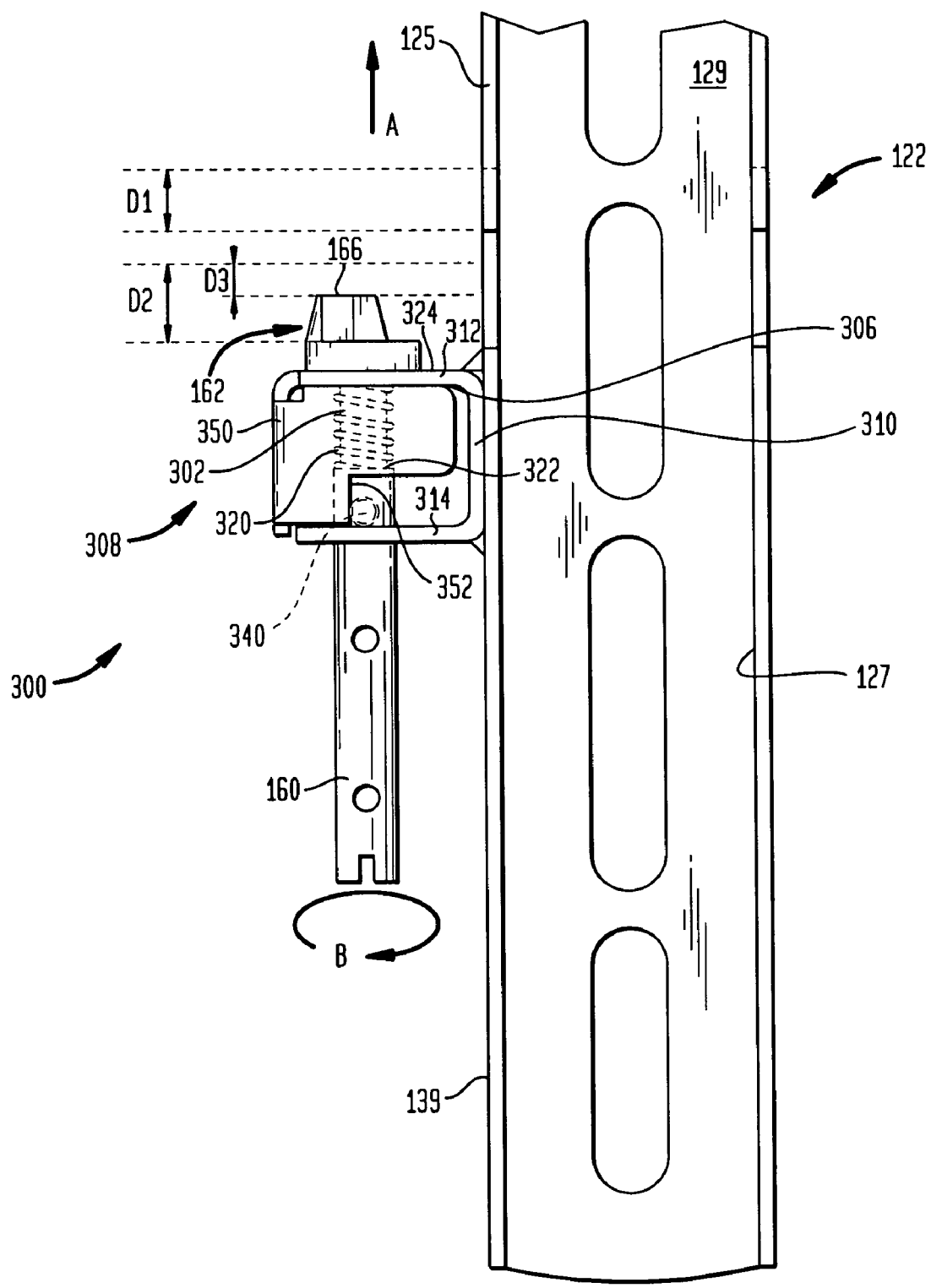
FIGS. 10A-10D show partial views of a monitor arm connected to a rotating locking element, in accordance with other aspects of the invention.
Figure 10B:
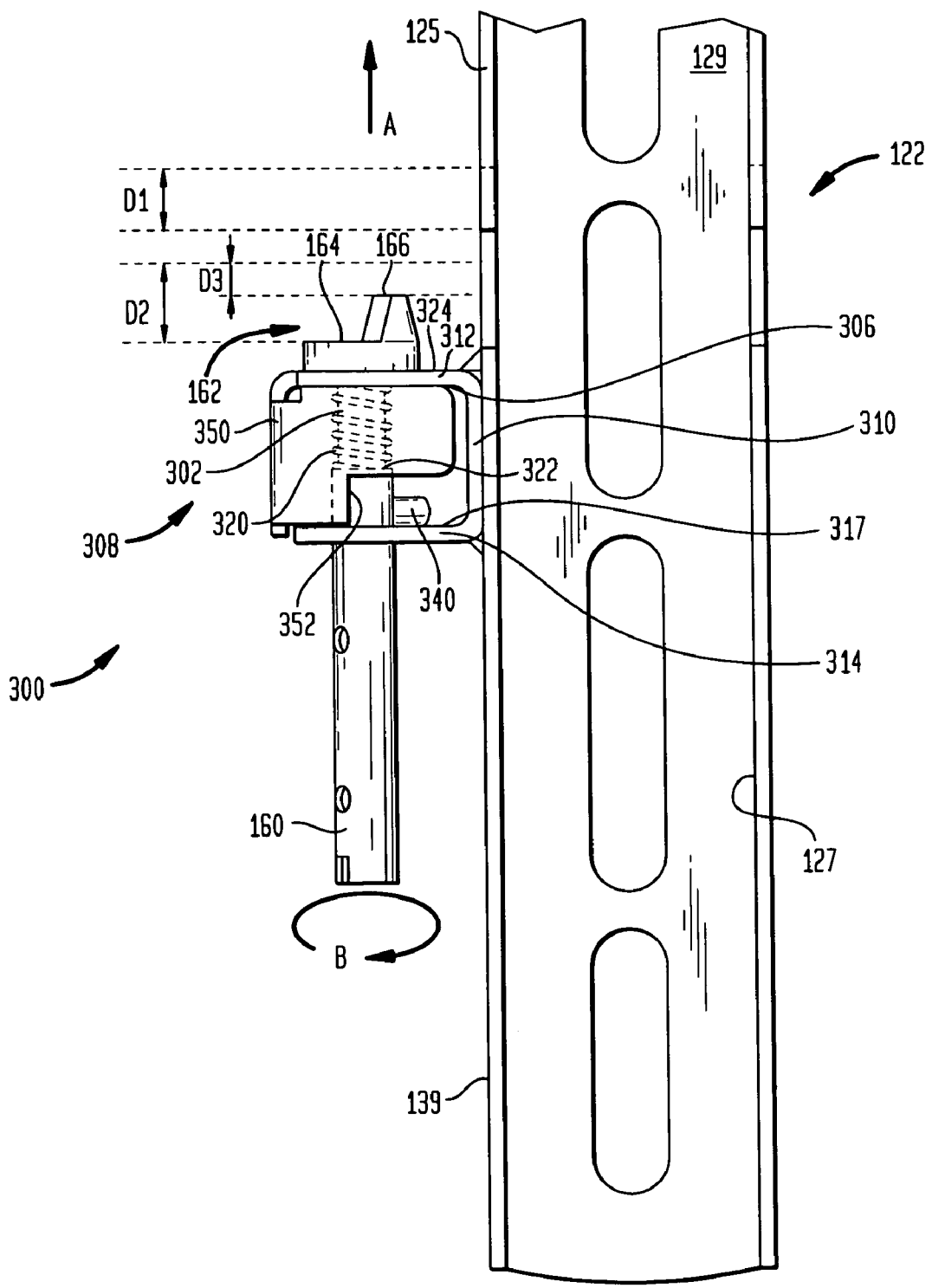
Figure 10C:
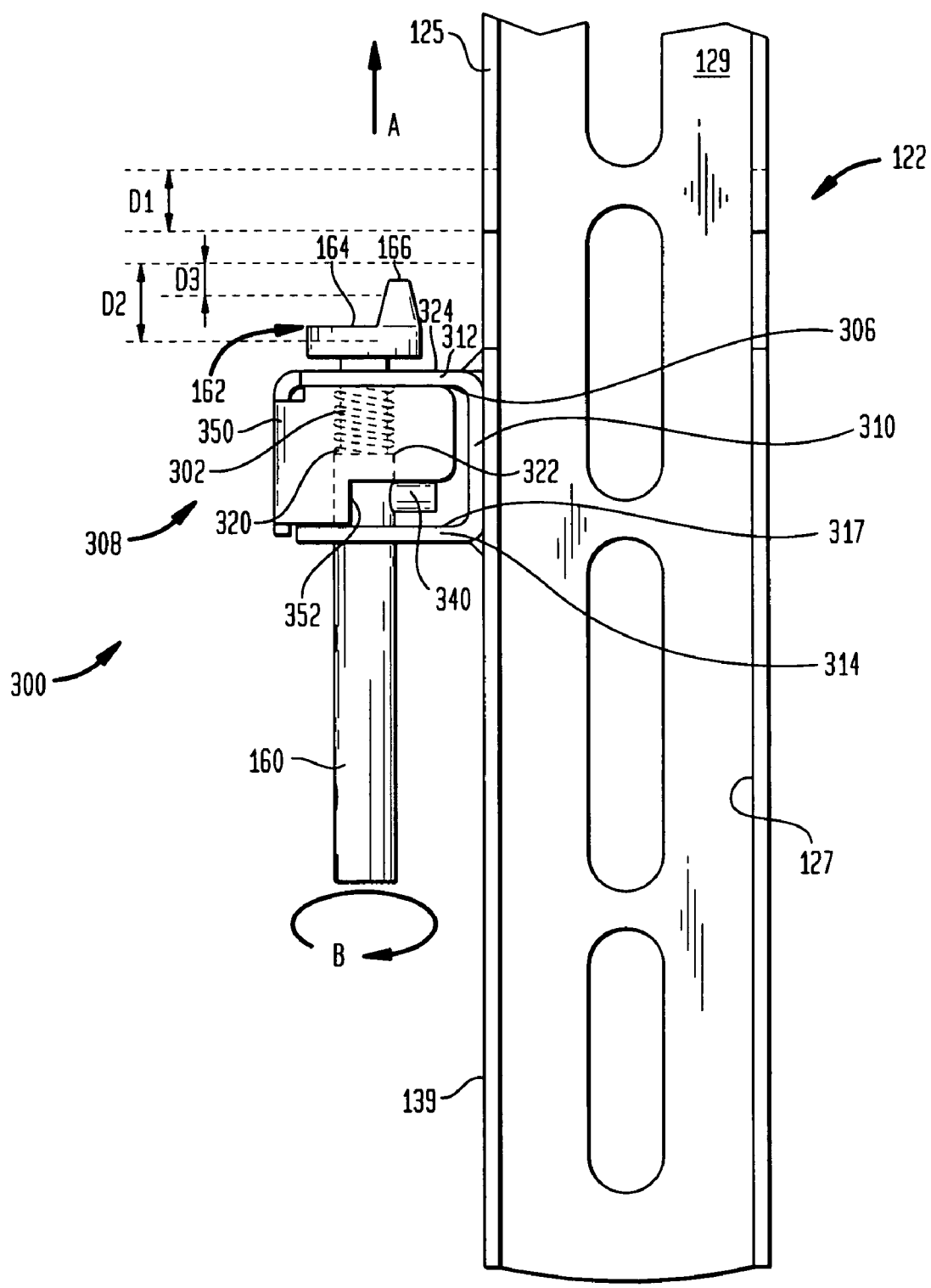

In one embodiment, a user may continuously apply a force in the direction A while rotating the cylinder 160, as shown in FIG. 10C, such that the top portion 162 is maintained above the flange 312 during rotation. Desirably, the barrel 302 and the spring 320 of the mechanism 300 are adapted so that the maximum vertical distance that the cylinder 160 can be moved in the direction A is less than D2.

Figure 10D:
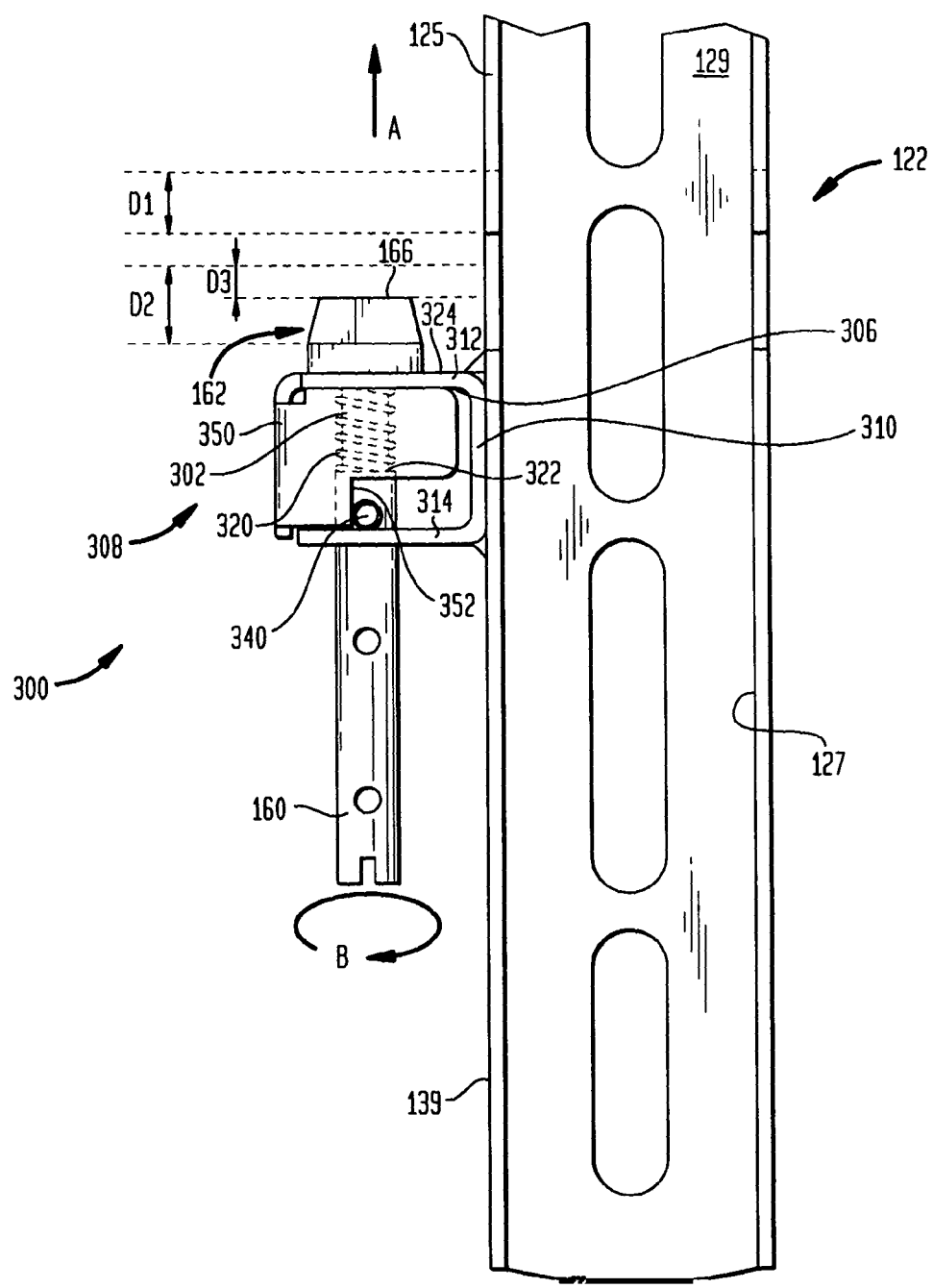

In still another aspect of the invention, the locking mechanism 300 may be adapted to restrict the extent or range of rotation of the cylinder 160 and provide an indication that the cylinder 160 has been rotated to set a desired or ideal locked or unlocked position. Referring again to FIGS. 10A, 10B, 10C and 10D, a pin 340 may radially extend from the cylinder 160 between the flanges 312 and 314. The pin 340 is desirably positioned on the cylinder 160 such that, when the top portion 162 normally rests on the surface 324 of the flange 312, the pin 340 rests on upper surface 317 of the flange 314. The housing 300 further may include a stop element 350, such as a flange, attached to, or desirably integral with, the flange 312. The stop element 350 may include a contact surface 352 positioned in relation to the cylinder 160, such that, when the cylinder 160 is rotated 180 degrees in the direction indicated by the arrow B, from an unlocked position setting as shown in FIG. 10A, the contact surface 352 contacts the pin 340, and prevents further rotation of the pin 340 in the direction B, when a desired or ideal locked position of the mechanism 300 is set as shown in FIG. 10D. Contact between the pin 340 and the surface 352 would indicate to the user that a desired or ideal locked position has been set. It is to be understood that the contact surface 352 may be suitably positioned in relation to the cylinder 160, to limit rotation between a setting in an unlocked position as shown in FIG. 10A, and a desired locked position, such as shown in FIG. 10B, which is set by rotating the cylinder 160 less than 180 degrees from the unlocked position of FIG. 10A.

In addition, in a further embodiment, the housing 308 may include another contact surface (not shown) for limiting rotation of the cylinder 160 in a direction opposite to the direction B, and therefore provide an indication when the mechanism 300 is moved from a locked position to a desired or ideal unlocked position.

Figure 11A:
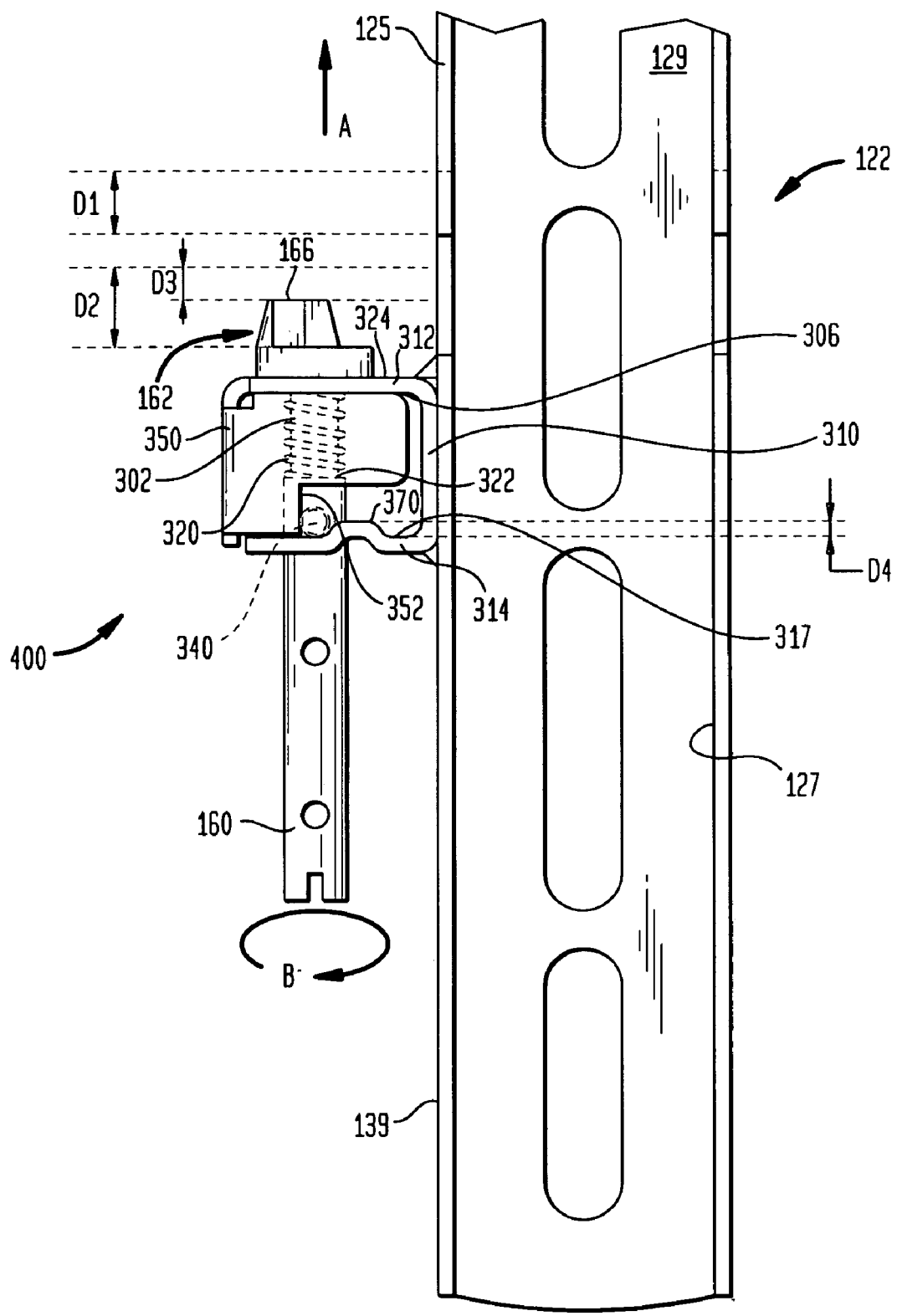
FIGS. 11A-11C show partial views of a monitor arm connected to a rotating locking element, in accordance with still other aspects of the invention.
Figure 11B:
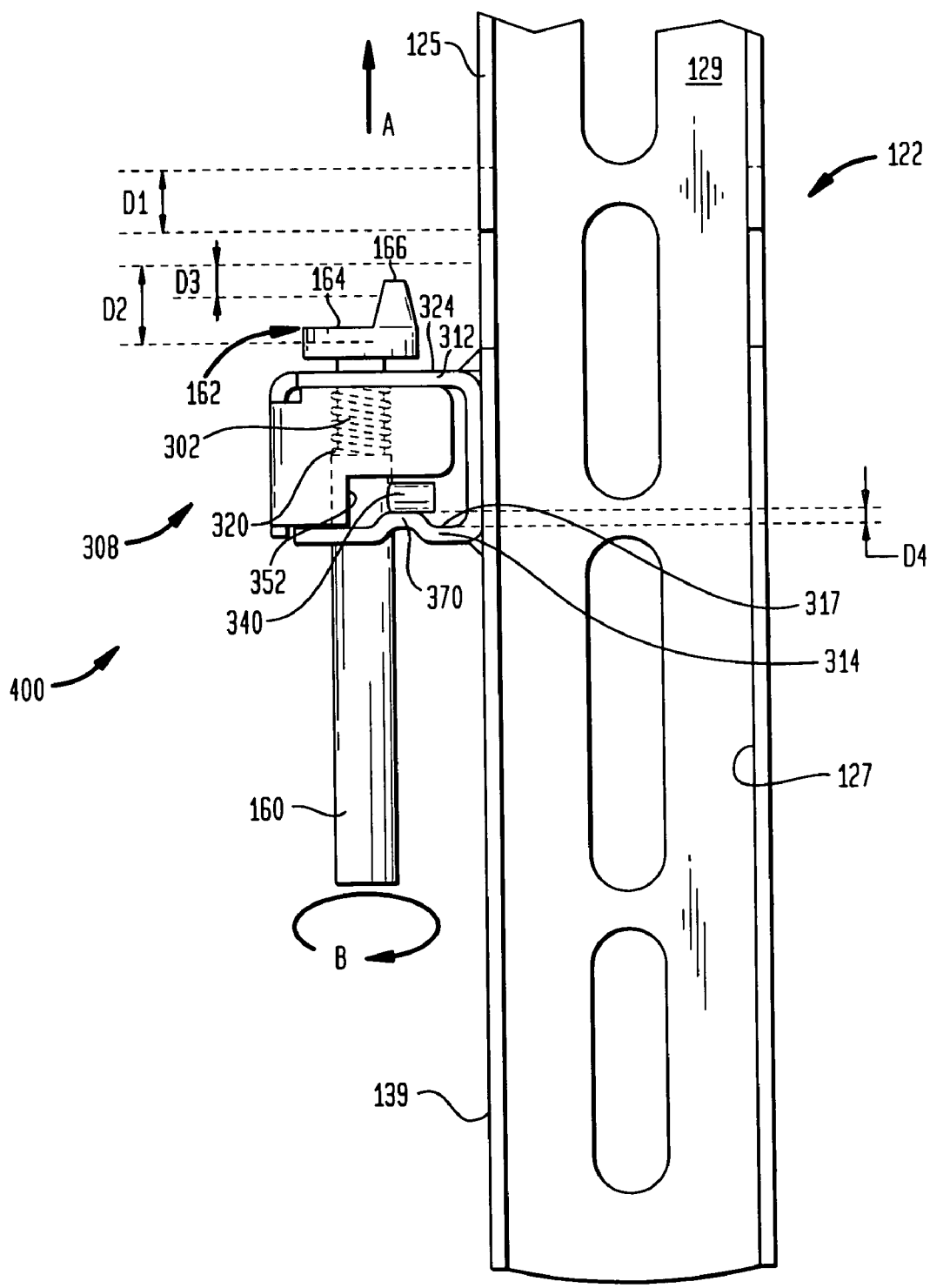
Figure 11C:
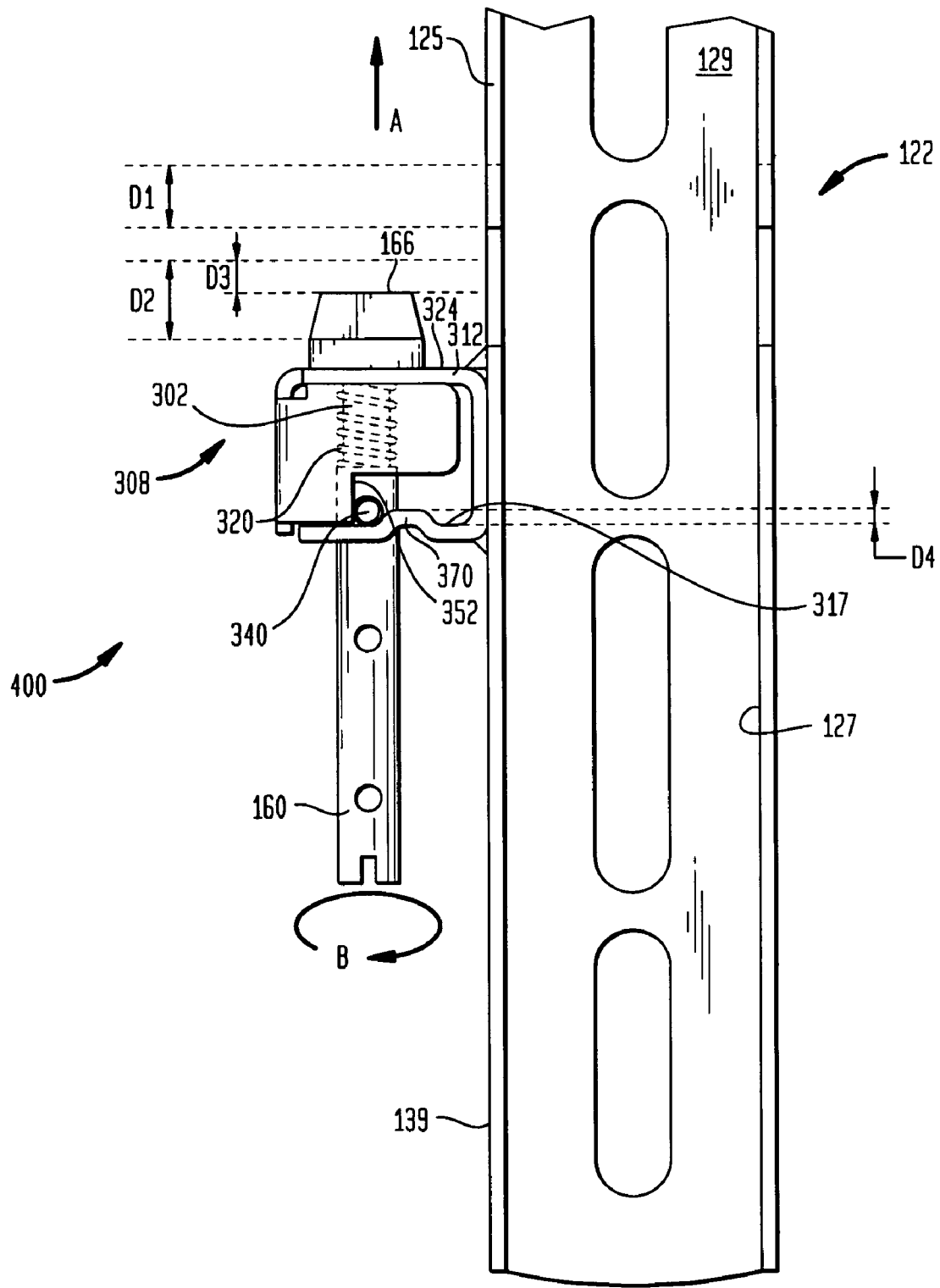

In still another aspect of the invention, a locking mechanism 400, as exemplarily shown in FIGS. 11A, 11B and 11C, and which is desirably constructed similar to and includes the same or similar elements as the locking mechanism 300, may engage the cylinder 160 with the housing 308, when the cylinder 160 is rotated to set a desired unlocked or locked position for the mechanism 400. When the cylinder 160 is engaged with the housing 308, the cylinder 160 must first be disengaged from the housing 308 before the cylinder 160 can be rotated to set a different unlocked position or locked position. Elements of the locking mechanism 400 which are the same or similar to those in the mechanism 300, as discussed above, are referred to below using the same reference numerals. For highlighting the features of the mechanism 400, the mechanism 400 is illustrated in FIGS. 11A, 11B and 11C as being connected to a monitor arm 122, similarly as described above for the mechanism 140, where the hook 128 of the monitor arm 122 may be engaged with and disengaged from the ledge 118 of the wall plate 102 as described above for the system 100. Referring to FIGS. 11A, 11B and 11C, in one embodiment the flange 314 of the mechanism 400 may include a keying surface portion 370 projecting a distance D4 from the surface 317 toward the flange 312, and extending from one side 388 to an opposing side 389 of the flange 314. D4 desirably is equal to or greater than the radius of the pin 340, and the keying portion 370 is positioned in relation to the surface 352, such that, when the mechanism 400 is set to an unlocked or locked position, as shown in FIGS. 11A and 11C, respectively, the pin 340, which is urged in the direction opposite to the direction A by the spring 320, is seated on the surface 317 of the flange 314 and abuts both the contact surface 352 and the keying surface 370. In such position of the pin 340, the cylinder 160 is engaged with the housing 308.

In a desired embodiment as illustrated in FIGS. 11A and 11C, the pin 340 may be positioned at diametrically opposed locations (180 degrees apart) to set the mechanism 400 to unlocked and locked positions, at which the cylinder 160 is engaged with the housing 308. When the cylinder 160 is engaged with the housing 308 as described, the combination of the spring 320 urging the pin 340 against the flange 314 and the stop surface 352 and the keying portion 370 abutting the pin 340 restricts free rotation of the pin 340. A force in the direction A sufficient to overcome the biasing force of the spring 320, and raise the pin 340 at least a distance D4 above the surface 317, can be applied to the cylinder 160 to disengage the cylinder 160 from engagement with the housing 308. When the pin 340 is maintained at least a distance D4 above the surface 317, the cylinder 160 is disengaged from the housing 308 and the keying portion 370 no longer obstructs rotation of the pin 340, such that desirably a relatively moderate rotational force applied to the cylinder 160, in the direction B or opposite to the direction B, would cause rotation of the cylinder 160, to set a different unlocked or locked position for the mechanism 400. In one embodiment, a sufficient force in the direction of the arrow A, for disengaging the cylinder 160 from the housing 308, may be applied to the cylinder 160 simultaneously with a force for rotating the cylinder 160.

In one embodiment, referring to FIG. 11B, the cylinder 160 may be rotated about 90 degrees, from an unlocked position setting as shown in FIG. 11A, so that the pin 340 rests on the keying portion 370, which would constitute a locked position of the mechanism 400 at which the cylinder 160 is not engaged with the housing 308.

Figure 12A:
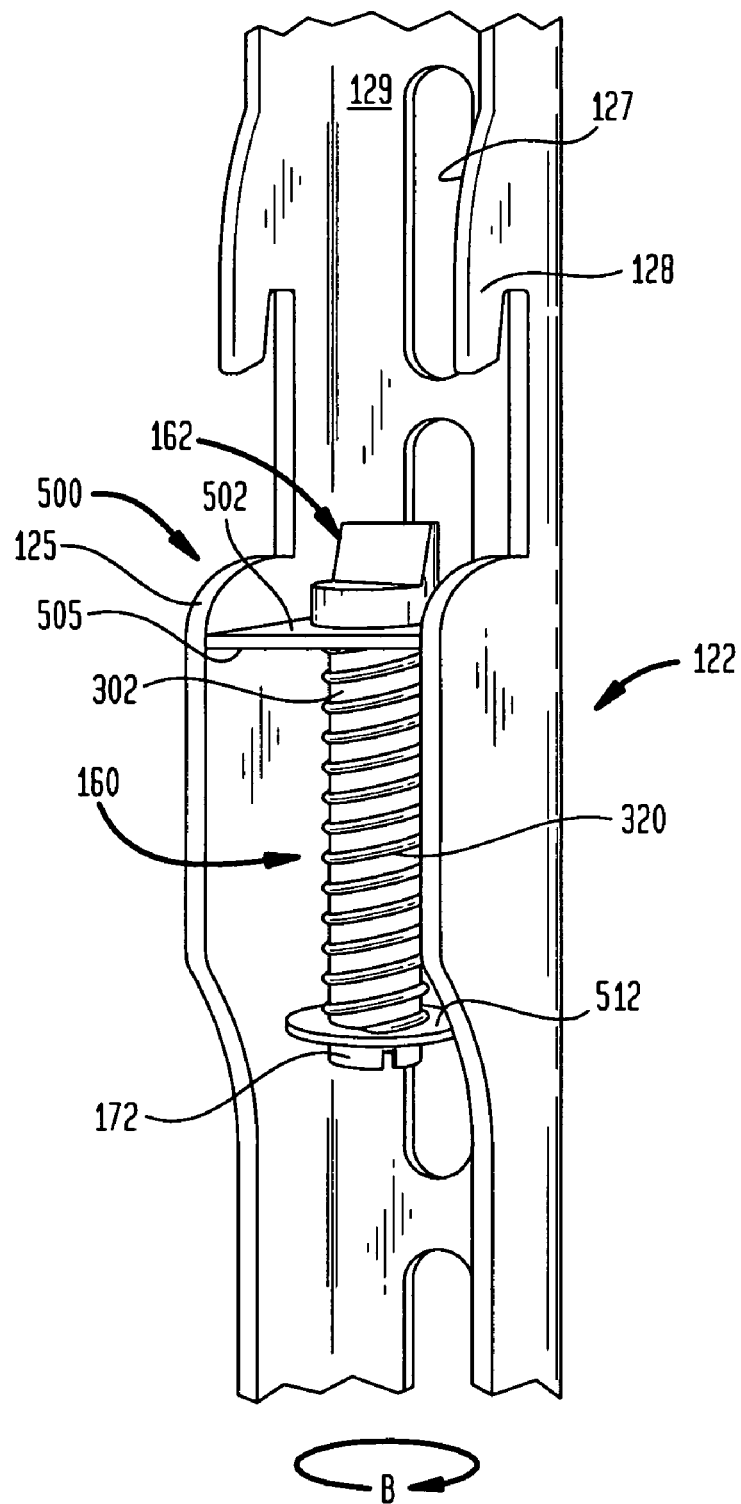
FIG. 12A shows a partial view of a monitor arm connected to a rotating locking element, in accordance with still other aspects of the invention.
Figure 12B:
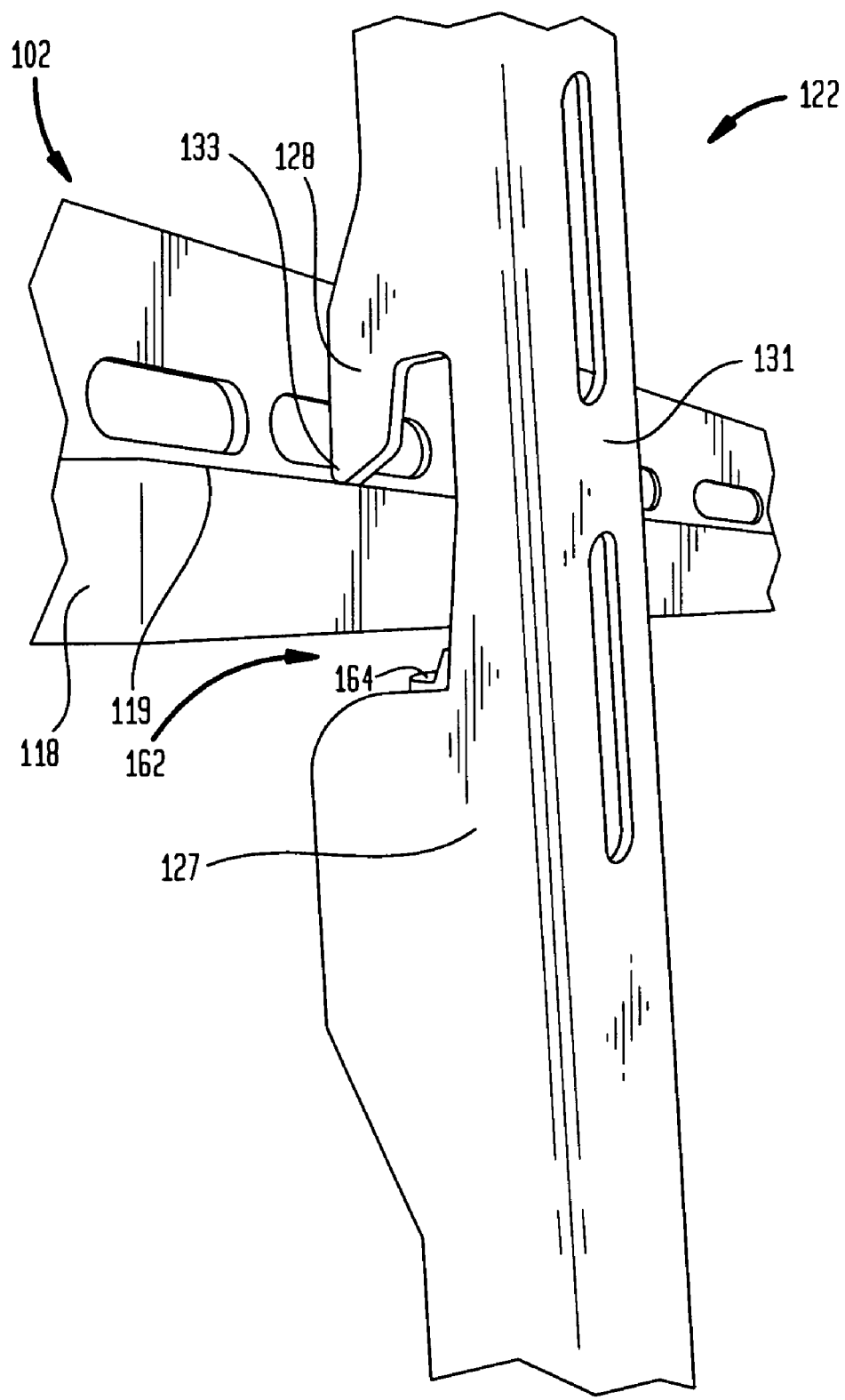
FIG. 12B shows a partial view of the monitor arm with the rotating locking element of FIG. 12A, positioned in relation to a wall plate with the rotating locking element in an unlocked position.
Figure 12C:
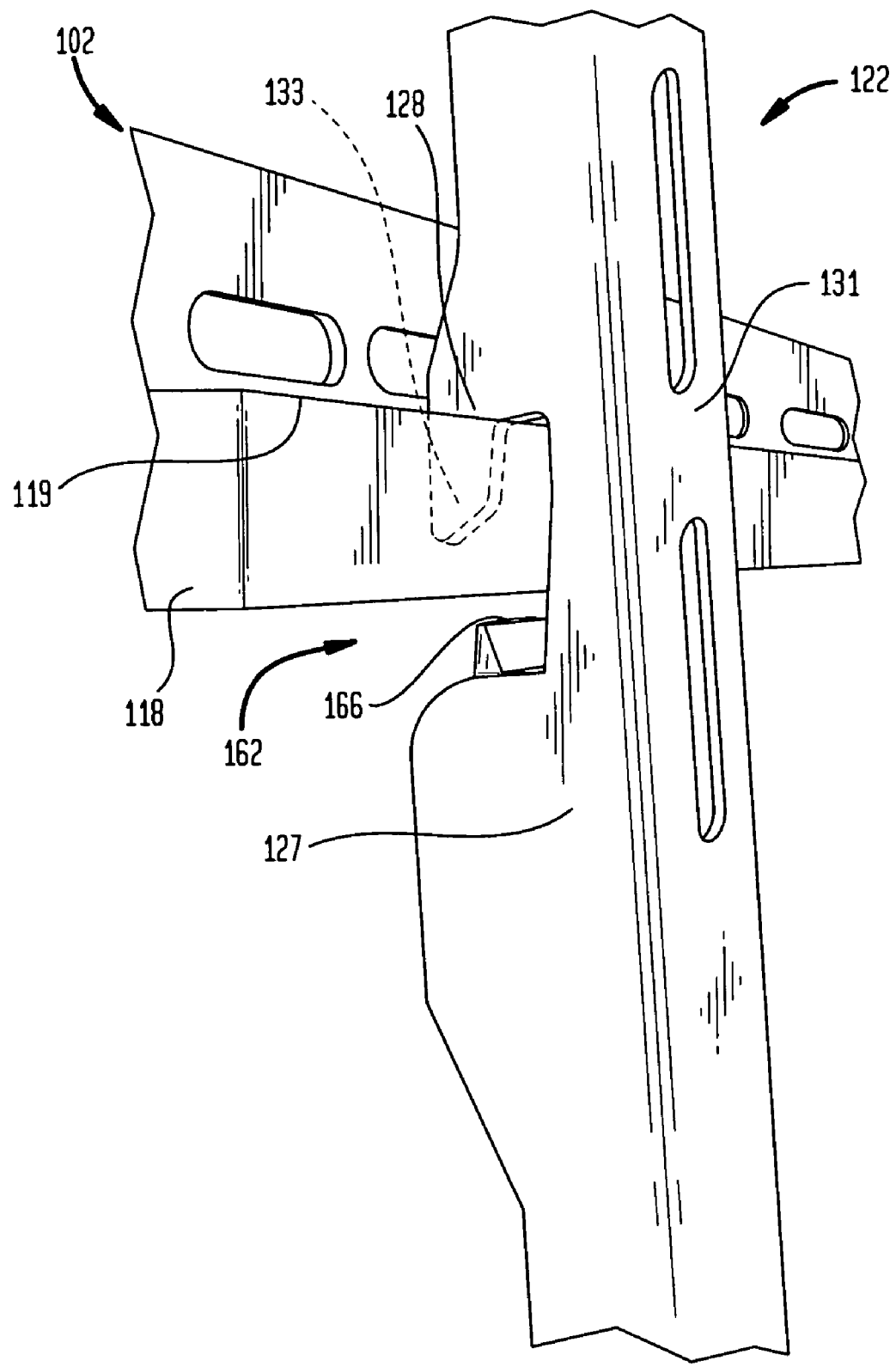
FIG. 12C shows a partial view of the monitor arm with the rotating locking element of FIG. 12A, mounted to a wall plate with the rotating locking element in a locked position.

In accordance with another aspect of the invention, a locking mechanism 500, as exemplarily shown in FIGS. 12A, 12B and 12C and which is constructed similar to and includes some of the same or similar elements as the locking mechanism 300, may be connected between the sides of a monitor arm. Elements of the locking mechanism 500, which are the same or similar to those in the mechanism 300 discussed above, are referred to below using the same reference numerals. For highlighting the features of the mechanism 500, the mechanism 500 is illustrated in FIGS. 12A, 12B and 12C as being connected to a monitor arm 122 of the system 100, where the hook 128 of the monitor arm 122 may be engaged with and disengaged from the ledge 118 of the wall plate 102 similarly as described above for the system 100. Referring to FIGS. 12A, 12B and 12C, the mechanism 500 includes a barrel 302 extending through an opening of a flange 502. The flange 502 is connected to and extends orthogonally from a back wall 123 of a monitor arm 122. The barrel 302 interconnects a top portion 162 of cylinder 160 with a remaining portion of the cylinder 160, and the flange 502 separates the top portion 162 from the remainder of the cylinder 160. The cylinder 160 includes a radial ridge 512 at a tool head end 172, which is opposite the top portion 162. A spring 320 having one end connected to the ridge 512 and an opposite end connected to a bottom surface 505 of the flange 502 encircles the cylinder 160. The top portion 162 has a configuration and is positioned in relation to the back wall 123 of the arm 122, such that the mechanism 500 may be moved between a locked position and an unlocked position by rotating the cylinder 160 a portion of a revolution, in the direction B or the opposite direction, similarly as described above for the mechanism 140.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A television mounting system comprising:
a wall plate;
at least one monitor arm mountable on the wall plate;
a rotating locking element permanently connected with the at least one monitor arm and moveable, by rotation of the rotating element less than a revolution, between an unlocked position for enabling dismounting of the at least one monitor arm from the wall plate and a locked position for preventing dismounting of the at least one monitor arm from the wall plate, wherein the rotating element includes a first side having a different height than a second side;

wherein, when the rotating element is in the locked position and the at least one monitor arm is mounted on the wall plate, the first side of the rotating element is a first distance in a first direction opposite from a contact portion of the wall plate; and wherein the first distance is less than a second distance in the first direction the monitor arm must be moved for dismounting the monitor arm from the wall plate, such that, with the rotating element in the locked position and the monitor arm mounted on the wall plate, the first side when moved in the first direction contacts the contact portion opposite the first side in the first direction before the monitor arm can be moved the second distance in the first direction, thereby preventing dismounting of the monitor arm from the wall plate.

2. The system of claim 1, wherein, when the rotating element is in the unlocked position and the at least one monitor arm is mounted on the wall plate, the second side of the rotating element is a third distance in the first direction opposite from the contact portion of the wall plate, and wherein the third distance is greater than the second distance, such that, with the rotating element in the unlocked position and the monitor arm mounted on the wall plate, the monitor arm can be moved a distance in the first direction at least equal to the second distance before the second side moving in the first direction contacts the contact portion of the wall plate opposite the second side, thereby enabling dismounting of the monitor from the wall plate.

3. The system of claim 1, wherein
the less than a revolution is at least about 30 degrees.

4. The system of claim 1, wherein one end of the rotating element includes the first and second sides, the system further comprising:
an extension element including an end connectable to an end of the rotating element opposite the one end of the rotating element, wherein an end of the extension element opposite to the end connectable to the rotating element includes at least one groove engageable by a tool for rotating the rotating element between the unlocked position and the locked position.

5. The system of claim 1, wherein the rotating element is connected opposite a back wall of the monitor arm.

6. The system of claim 1, wherein the rotating element is connected to a side extending from a back wall of the monitor arm.

7. The system of claim 1 further comprising:
a flange attached to the monitor arm and including an opening through which the rotating element extends, wherein the flange separates an upper portion of the rotating element including the first and second sides and from a lower portion of the rotating element; and
a resilient element coupled to the flange and the lower portion of the rotating element, wherein the resilient element urges the upper portion of the rotating element against the flange, such that at least a predetermined force is required for rotating the rotating element.

8. The system of claim 7, wherein the resilient element is a spring.

9. The system of claim 1 further comprising:
at least one stop element for restricting a range of rotation of the rotating element.

10. The system of claim 9 further comprising:
an engagement element extending from the rotating element, wherein the stop element is positioned for contacting the engagement element for restricting the range of rotation of the rotating element.

11. The system of claim 10, wherein the stop element is positioned for restricting the range of rotation of the rotating element at the locked position or the unlocked position of the rotating element.

12. The system of claim 10, wherein the engagement element is a pin.

13. The system of claim 1 further comprising:
a keying element for indicating a rotational position of the rotating element.

14. The system of claim 13, wherein the keying element indicates whether the rotating element is at a desired locked position.

15. The system of claim 13 further comprising:
at least one stop element for restricting a range of rotation of the rotating element by contacting an engagement element extending from the rotating element, wherein the stop element and the keying element, in combination, are for engaging the engagement element.

16. The system of claim 15, wherein the engagement element is a pin and the keying element opposes, and is spaced from, the stop element, and wherein the pin is in an engaged position when disposed between the key element and the stop element.

17. The system of claim 16 further comprising:
a resilient element coupled to the rotating element for restricting free rotation of the pin.

18. The system of claim 1, wherein
the at least one monitor arm comprises at least one hook engageable with the wall plate for mounting the at least one monitor arm on said wall plate, wherein when the monitor arm is mounted to the wall plate, the hook must be moved a distance in the first direction equal to the second distance for enabling dismounting of the monitor arm from the wall plate.

19. The system of claim 1, wherein a first end of the rotating element includes the first and second sides and a second end of the rotating element opposite the first end includes a friction engaging surface.

20. The system of claim 1, wherein a first end of the rotating element includes the first and second sides and a second end of the rotating element opposite the first end includes at least one groove engagable by a tool for rotating the rotating element between the unlocked position and the locked position.

21. A television mounting system comprising:
a wall plate including first engaging member;
at least one monitor arm including at least one second engaging member for engaging with the first engaging member, wherein the monitor arm is mountable on the wall plate by engagement of the first engaging member with the second engaging member; and
a rotating locking means permanently connected with the at least one monitor arm and being moveable, by rotation of the rotating means less than a revolution, between an unlocked position for enabling dismounting of the at least one monitor arm from the wall plate and a locked position for preventing dismounting of the at least one monitor arm from the wall plate, wherein the rotating means includes a first side having a different height than a second side;
wherein, when the rotating means is in the locked position and the at least one monitor arm is mounted on the wall plate, the first side of the rotating means is a first distance in a first direction opposite from a contact portion of the wall plate; and wherein the first distance is less than a second distance in the first direction the second engaging member must be moved for being disengaged with the first engaging member for enabling dismounting of the monitor arm from the wall plate, such that, with the rotating means in the locked position and the monitor arm mounted on the wall plate, the first side when moved in the first direction contacts the contact portion opposite the first side in the first direction before the second engaging member can be moved the second distance in the first direction, thereby preventing dismounting of the monitor arm from the wall plate.

22. The system of claim 21,
wherein, when the rotating means is in the unlocked position and the at least one monitor arm is mounted on the wall plate, the second side of the rotating means is a third distance in the first direction opposite from the contact portion of the wall plate, and
wherein the third distance is greater than the second distance, such that, with the rotating means in the unlocked position and the monitor arm mounted on the wall plate, the second engaging member can be moved a distance in the first direction at least equal to the second distance before the second side moving in the first direction contacts the contact portion of the wall plate opposite the second side, thereby enabling dismounting of the monitor from the wall plate.

23. The system of claim 21 further comprising:
extension means connectable to the rotating means for selectively extending a length of the rotating means, and including means for engagement with a tool for rotating the rotating means between the unlocked position and the locked position.

24. The system of claim 21 further comprising:
restricting means coupled to the rotating means for restricting free rotation of the rotating means.

25. The system of claim 24, wherein the restricting means includes means for indicating rotation of the rotating means to a desired locked position or desired unlocked position.

26. The system of claim 24, wherein the restricting means includes means for restricting rotation of the rotating means to less than or equal to about 180 degrees.

* * * * *